United States Patent [19]

Moore

[11] Patent Number: 4,632,207

[45] Date of Patent: Dec. 30, 1986

[54] MECHANISM TO ENGAGE PART TIME DRIVE SYSTEM IN A MOVING VEHICLE

[75] Inventor: Thomas S. Moore, Northville, Mich.

[73] Assignee: Ford Motor Company, Dearborn, Mich.

[21] Appl. No.: 772,816

[22] Filed: Sep. 5, 1985

Related U.S. Application Data

[62] Division of Ser. No. 539,203, Oct. 5, 1983.

[51] Int. Cl.⁴ ............................................. B60K 17/34
[52] U.S. Cl. ............................. 180/247; 74/665 GE; 192/67 A
[58] Field of Search .............................. 180/247, 233; 74/665 GE, 665 T, 665 GA, 665 GC, 665 GD; 192/67 A, 53 A, 53 B, 53 R, 3.28, 3.21, 67 R, 57, 58 C

[56] References Cited

U.S. PATENT DOCUMENTS

| | | | |
|---|---|---|---|
| 1,858,514 | 5/1932 | Lell | 192/57 X |
| 2,130,895 | 9/1938 | Ness | 192/53 B |
| 2,785,783 | 3/1957 | Homrig et al. | 192/114 |
| 2,851,115 | 9/1958 | Buckendale | 74/665 GC |
| 3,059,740 | 10/1962 | Roche | 192/3.28 |
| 3,300,002 | 1/1967 | Roper | 192/57 X |
| 3,910,131 | 10/1975 | Richards | 192/67 X |
| 4,300,667 | 11/1981 | Fogelberg | 180/247 X |
| 4,344,335 | 8/1982 | Kawai | 74/665 GA |
| 4,367,661 | 1/1983 | Moroto et al. | 74/665 GE |
| 4,555,003 | 11/1985 | Phillips | 192/53 B |

FOREIGN PATENT DOCUMENTS

| | | | |
|---|---|---|---|
| 680578 | 9/1939 | Fed. Rep. of Germany | 192/3.2 |
| 522324 | 4/1955 | Italy | 192/67 R |

*Primary Examiner*—John A. Pekar
*Attorney, Agent, or Firm*—Frank G. McKenzie; Donald J. Harrington

[57] ABSTRACT

The transfer case of a vehicle that can be driven in two-wheel drive or four-wheel drive includes a range speed transmission driveably connected to the output of a multiple speed ratio transmission and adapted to drive the transfer case output shaft. A drive sprocket journalled on the output case is driveably connected by a chain belt to a driven sprocket that is connected to the front driveshaft. The front axle has a differential that transmits power from the front driveshaft to left and right axleshafts when four-wheel drive is selected. Automatic locking hubs driveably connect the front axleshafts to the front wheel assemblies and are adapted to automatically disengage when the front wheels rotate opposite the direction that produced engagement of the locking hubs. The drive sprocket is accelerated from rest to the speed of the output shaft of the transfer case through operation of a magnetic clutch or hydraulic coupling. A hub member engaged with the driven sprocket is moved to a position of potential engagement with the spline teeth on the output shaft when four-wheel drive operation is selected. The splines remain disengaged, however, until the speed of the drive sprocket reaches approximately that of the output shaft; then the splines engage and the sprocket is driven from the output shaft.

10 Claims, 8 Drawing Figures

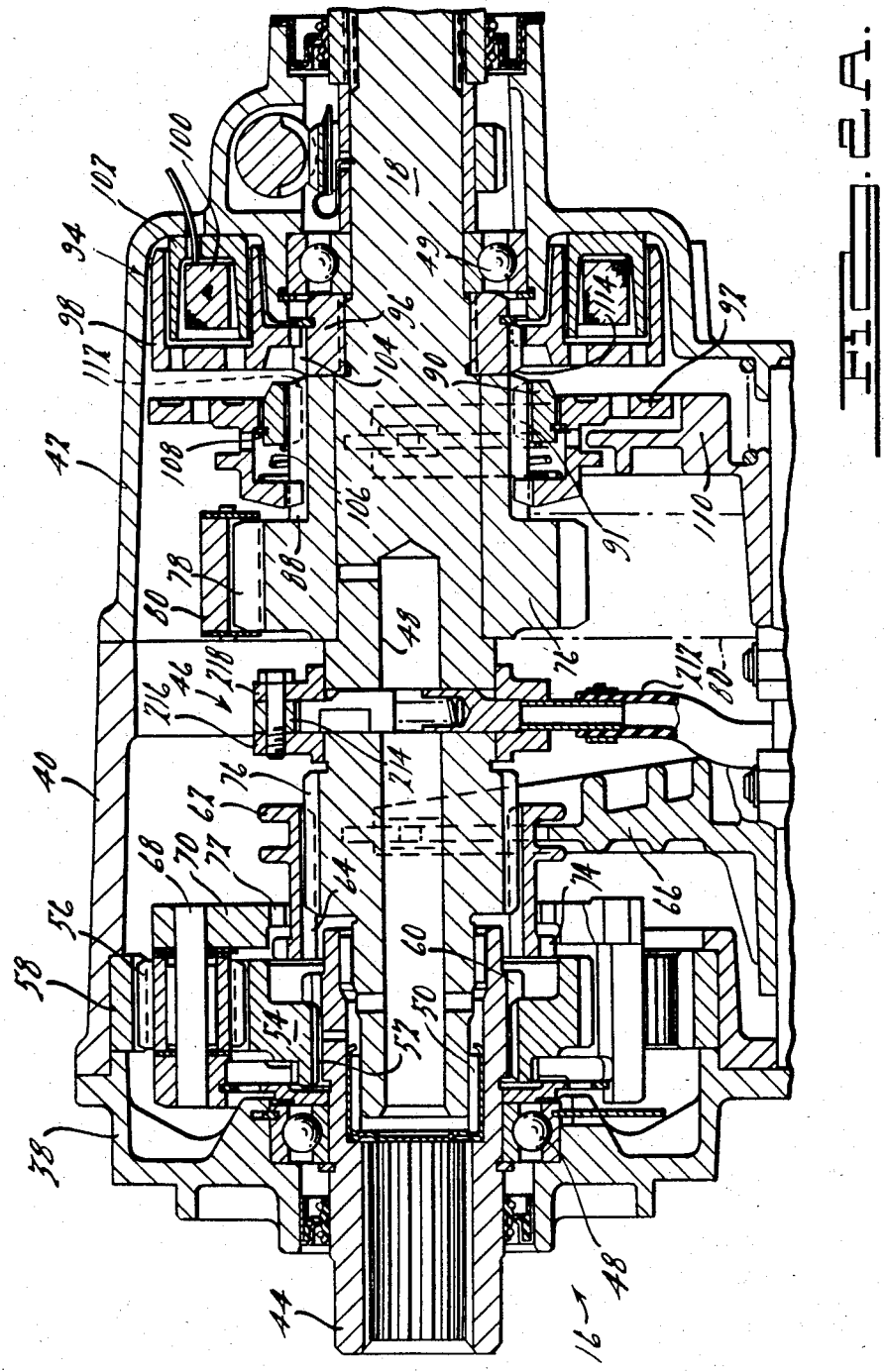

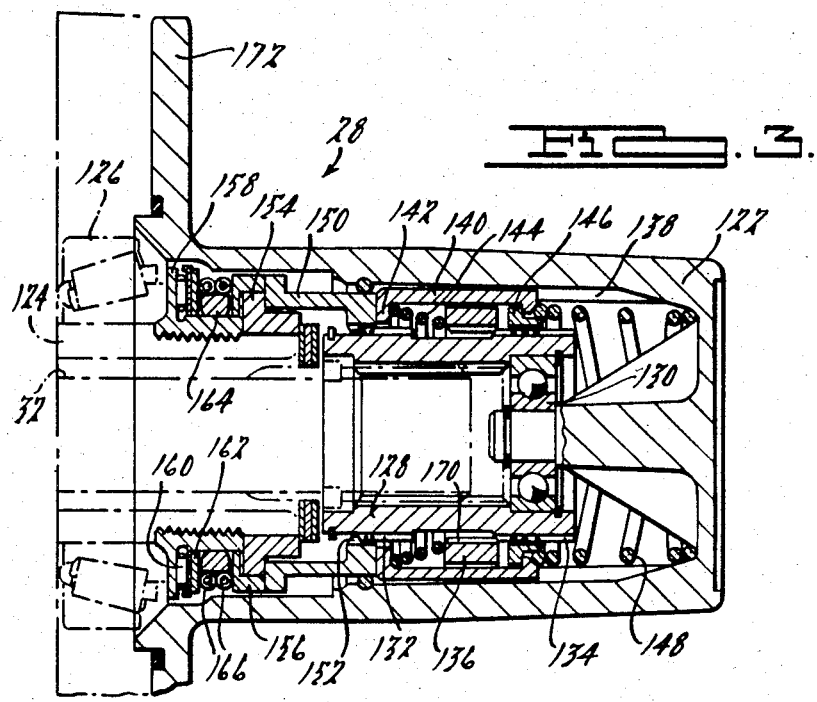
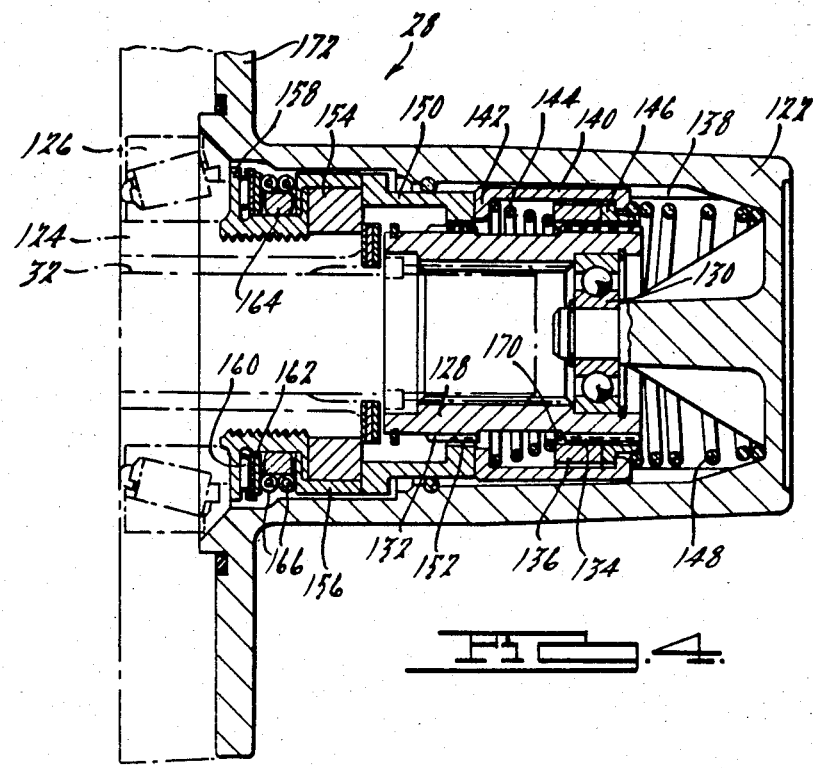

MECHANISM TO ENGAGE PART TIME DRIVE SYSTEM IN A MOVING VEHICLE

This is a division of application Ser. No. 539,203 pending filed Oct. 5, 1983.

BACKGROUND OF THE INVENTION

1. Field of the Invention

This invention pertains to the field of power transmission systems for vehicles, and more particularly, to such systems that transmit power at the option of the vehicle operator either to a first set of drive wheels or to first and second sets of drive wheels.

2. Description of the Prior Art

Formerly, in systems that provided only part-time four-wheel drive, a vehicle operator had to exit the passenger compartment in order to set the front wheel hub locks for four-wheel drive operation, then re-enter the vehicle and move the shift selector that controls the transfer case to the four-wheel drive position. Later, manufacturers introduced full-time, four-wheel drive systems that caused the front drive components to rotate continuously, thereby avoiding the need for selectively operated hub locks. Full-time four-wheel drive systems, however, have substantially reduced fuel economy compared to two-wheel drive systems because a large inertia mass must be continuously rotated.

Recently, automatic hub locks were introduced to eliminate the need for the operator to exit the vehicle in order to manually engage hub locks on the axle that is driven only part of the time. In some of the part-time, four-wheel drive systems, the vehicle must be stopped and shifted to four-wheel drive; then automatic hub locks are engaged when the vehicle is driven ahead. Hub lock disengagement is accomplished the first time the vehicle is moved in the opposite direction provided the transfer case shift is in the two-wheel drive position.

Still more recently, drive systems have been manufactured that permit shifting from two-wheel drive to four-wheel drive while the vehicle is moving. In such systems when two-wheel drive is selected, a sliding synchronizer collar within the front axle assembly disconnects one of the front axleshafts from the front differential allowing the ring gear of the differential, the front driveshaft and the transfer case chain to remain stationary while operating in two-wheel drive. However, these systems require that the casing, pinion and gears of the differential and both front axleshafts be driven by the four wheels during two-wheel drive operation, so loss of efficiency and reduced fuel mileage result. To engage four-wheel drive, the operator moves a shift lever to the 4-high position, which action energizes the synchronizer in the transfer case.

The sliding collar within the axle assembly disconnects one axleshaft from the differential so that the ring gear of the different, the driveshaft, and the transfer case chain remain stationary while the system produces two-wheel drive. However, the pinions and gears of the front differential unit and the front axleshafts rotate with and are driven by the front wheels during two-wheel drive operation. In order to engage four-wheel drive, the operator moves the shift lever to the four-wheel drive high speed ratio position. This action energizes the transfer case synchronizer to driveably connect the front drive shaft and causes it to accelerate to the speed that corresponds to the vehicle speed. Then a vacuum valve in the transfer case activates a vacuum diaphragm mounted in the engine compartment. The diaphragm pulls a cable, which moves the sliding collar in a front axle assembly to connect the differential to the previously disconnected front axleshaft. The shift from two-wheel drive to four-wheel drive can be made at speeds of up to 55 mph, but during cold weather and under other adverse conditions, where transmission oil viscosity is a factor, the shift must be made at slower speeds in order to keep the effort required to move the shift lever at a reasonable magnitude. In four-wheel drive operation, shifts are made between the high speed ratio and lower speed ratio provided the vehicle is stopped and the transmission is first shifted to neutral, as is the conventional practice.

In a part-time four-wheel drive system, conventional manual or automatic locking hubs may be used in connection with the front wheels. When the hubs are unlocked, the front wheels can rotate free of the front drive mechanism. In addition, the chain and sprocket assembly of the transfer case is disengaged by moving a shift lever in order to stop the front-drive mechanism.

SUMMARY OF THE INVENTION

One object of the present invention is to provide a system for transmitting power to the drive wheels of a vehicle wherein either one set of two sets of wheels are driven concurrently.

Another object of this invention permits the vehicle operator to move the shift lever to the four-wheel drive, high speed ratio position with no gear clash or grinding and with consistently low effort. This is accomplished independently of the speed at which the lever is moved and of the vehicle speed. The transfer case has an output shaft, which transmits power to the rear wheels continuously during operation, a driving member in the form of a chain sprocket, and a driven chain sprocket connected to the driving sprocket by a flexible, endless chain belt. A lock-up mechanism in the transfer case is movable by operation of the shift mechanism to an engagement position, where a driving connection is produced between the drive sprocket and the transfer case output shaft when their speeds are synchronous or nearly so, and to a release position where said connection becomes disengaged. A hub is splined to the driving sprocket and adapted for axial movement into and out of engagement with spline teeth carried by the output shaft. A shift collar, carried by the hub, is adapted to be moved axially by the shift mechanism. When the collar is moved rearward, a compression spring biases the hub rearward to a position where the rear face of its spline teeth is brought into contact with the front face of the spline teeth on the output shaft. When the shift selector is moved to the four-wheel drive position, the splines of the hub and of the output shaft are biased by the spring toward an engaged position, but the splines will not engage will the speed of the driving sprocket approaches or reaches the speed of the output shaft. When these speeds are equal or nearly so, the splines engage and power is transmitted from the output shaft through the hub to the driving chain sprocket. The chain transmits power to a front output shaft which drives the front axleshafts of the vehicle through a differential mechanism mounted coaxially with the front axleshafts. When the shift mechanism is moved to the two-wheel drive position, a retaining ring on the hub moves the collar spline out of engagement with the output shaft spline, thereby disconnecting the driving sprocket from the output shaft. When this occurs, only one set of drive wheels is driven through the transfer case from the transmission and the engine.

The speed of the driving sprocket is accelerated from rest toward the speed of the output shaft by a magnetic clutch whose coil is energized when four-wheel drive operation is selected through movement of the shift selector. The magnetic field developed by the coil of the magnetic clutch operates to rotate the driving sprocket when the collar is moved by the shift mechanism toward the magnetic clutch. This movement also brings the adjacent faces of the spline teeth of the collar and output shaft into contact where they are maintained by a compressed spring. Alternatively, the driving sprocket is accelerated through operation of a hydraulic coupling whose torus chamber is hydraulically sealed when four-wheel drive operation is selected as the shift collar is moved to the engagement position where the adjacent faces of the spline teeth on the collar and ouput shaft are brought into resilient contact. Hydraulic fluid from a pump located in the transfer case provides a stream of pressurized fluid to the toroidal chamber of the hydraulic coupling, in which the radially directed, angularly spaced impeller blades mounted on the output shaft and turbine blades carried on the shift collar are located. When four-wheel drive is selected, the collar is driven hydraulically by the impeller and is accelerated toward the speed of the output shaft until the speeds of the turbine and of the impeller are brought within a range where the effect of the compressed spring produces engagement of the hub spline and the output shaft spline. When two-wheel drive is selected, the shift collar is moved to the disengagement position, where the hydraulic seal of the toroidal chamber formed by the impeller and turbine rotors is opened and the hydraulic connection between the output shaft and the shift collar is thereby discontinued.

Automatic locking hubs located at each wheel of the wheel set that is driven only in four-wheel drive produce a driving connection between the axleshafts and the wheels without the need for the hub locks to be set manually for two-wheel drive or four-wheel drive operation. A cam follower is moved axially on the surfaces of fixed and moving cams permitting a clutch ring that is continuously connected to the wheel hub to become driveably connected to the axleshaft. In this way, the wheels of the vehicle become connected through operation of the locking mechanism to the axleshafts. When the shift selector is set for operation in two-wheel drive and the vehicle is driven in the opposite direction from that which produce hub lock engagement, the cam follower moves inboard on the cam surfaces, thereby disconnecting the hub assembly from the axleshaft. This action permits the axleshafts, differential ring gear, differential casing, pinions, side bevel gears, the front driveshaft, sprockets, and drive chain to be stopped when the vehicle operates in two-wheel drive.

BRIEF DESCRIPTION OF THE DRAWINGS

FIGS. 2A and 2B are partial cross sections of the transfer case taken at a horizontal plane through the axis of the output shaft and front driveshaft showing a magnetic clutch for accelerating the drive sprocket.

FIG. 3 is a cross section through the axis of a front axleshaft and wheel hub showing the components of the automatic locking hub in position to begin engagement of the axleshaft to the wheel hub.

FIG. 4 is a cross section similar to that of FIG. 3 showing the components of the automatic locking hub connecting the axleshaft to the wheel hub.

FIG. 5A shows the components in the disengagement position; FIG. 5B shows the engagement position where the driving and driven member are ready to be connected; FIG. 5C shows the hub connecting the driving and driven members.

DESCRIPTION OF THE PREFERRED EMBODIMENT

Figure 1:
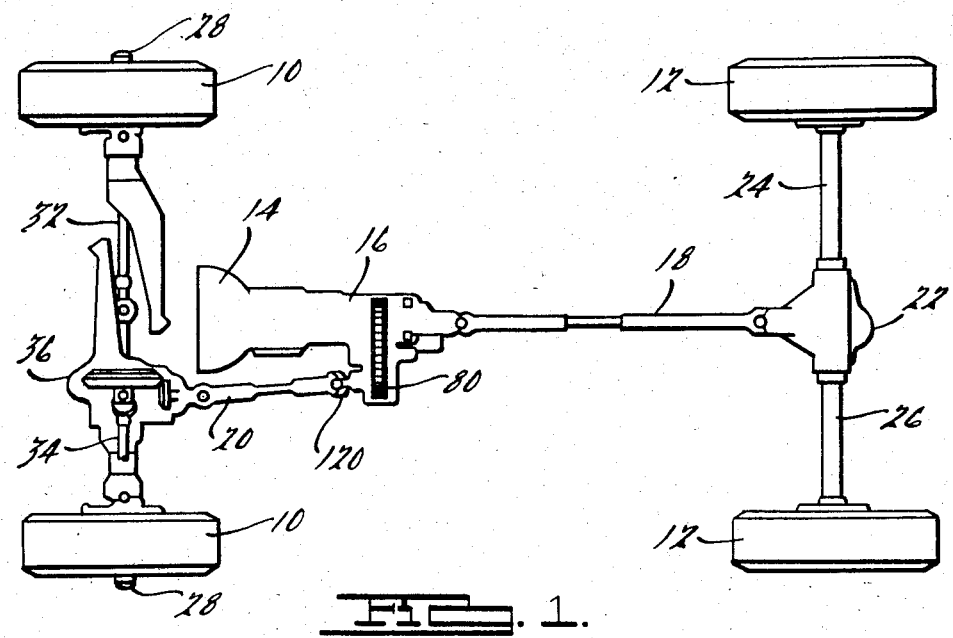
FIG. 1 is a plan view of the four-wheel drive system according to this invention.

Referring first to FIG. 1, a vehicle with which the device of the present invention can be used, includes front and rear sets of wheels 10, 12, an automatic or manual transmission 14 for producing multiple forward and reverse speed ratios driven by an engine (not shown), and a transfer case 16 for continuously driveably connecting the transmission output to a rear output shaft 18 and for selectively connecting the transmission output to a front output shaft 20. Shaft 18 transmits power to a rear differential 22 from which power is transmitted to the rear wheels 12 through axleshafts 24, 26. The front wheels 10 are driveably connected under certain conditions to right and left axleshafts 32, 34 to which power is transmitted from the front driveshaft through a front differential 36.

Figure 2B:
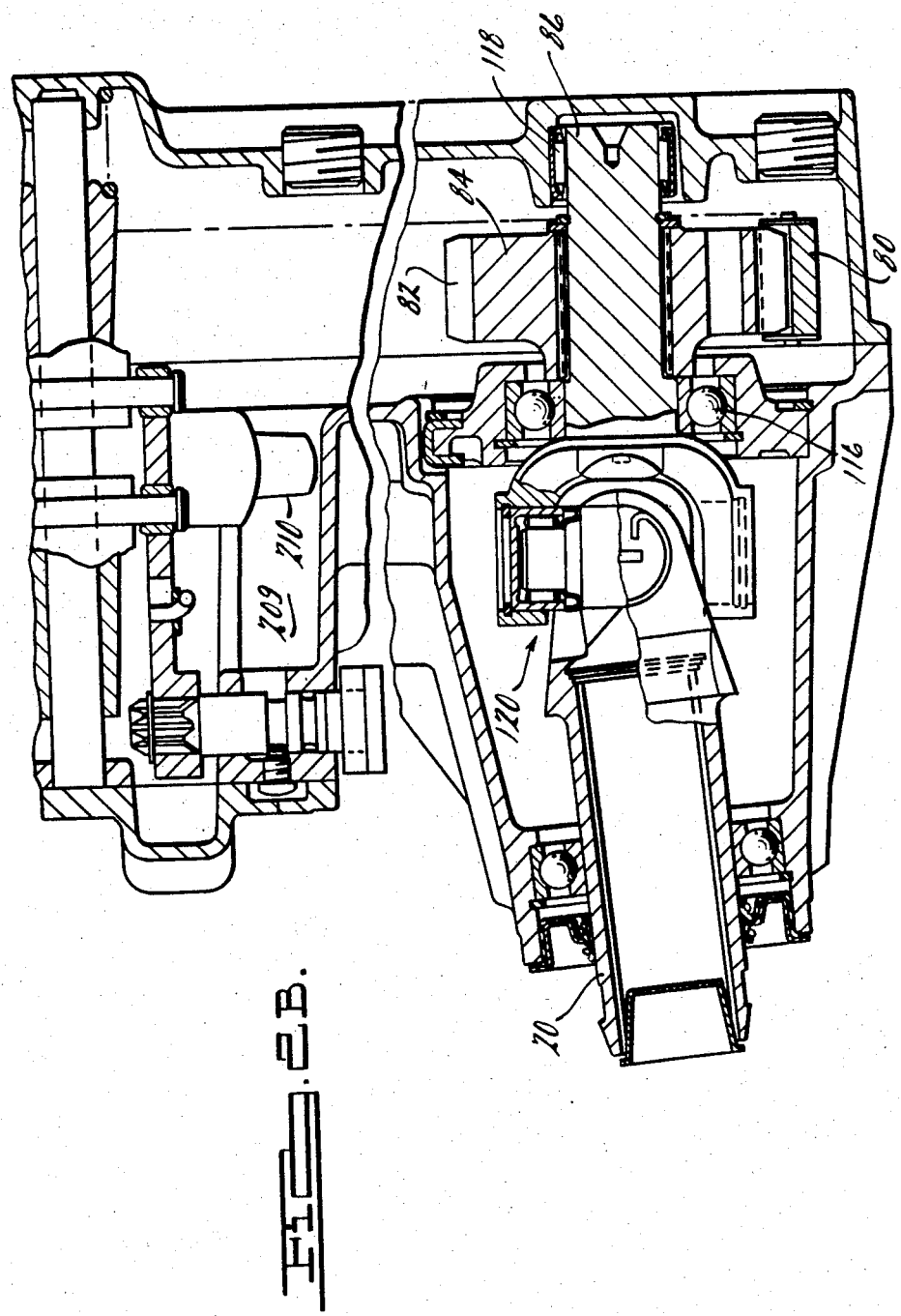

Referring now to FIGS. 2A and 2B, the transfer case 16 includes a casing formed of three parts 38, 40, 42 joined mechanically at mating flange surfaces. Power from the transmission output shaft 44 is delivered from the transfer case to the rear driveshaft 18 and, under certain conditions, to the front driveshaft 20. The transfer case is lubricated by a positive displacement pump 46 that channels oil flow through an axially directed bore 48 formed in the rear output shaft. Because the pump turns with the rear output shaft, the vehicle can be towed at normal road speeds for extended distances without disconnecting the front or rear driveshafts. Transmission shaft 44 is supported on a bearing 48 fitted within the adaptor cover 38 and the forward end of the rear driveshaft is supported within the bore of the transmission output shaft on needle bearings 50.

Shaft 44 is connected by a spline 52 to a sun gear 54, which is in continuous meshing engagement with a set of planetary pinions 56, each also in continuous meshing engagement with a ring gear 58 splined to the front case half 40.

A set of spline teeth 60 is formed at the inner end of shaft 44 and is adapted to be engaged selectively by a high-low shift selector hub 62. When the hub is moved forward, the spline 64 formed on its inner surface engages the outer splined surface 60 of transmission shaft 44. The high-low shift fork 66 is controlled by the vehicle operator through manual operation of the high-low range gear shift lever located within the passenger compartment of the vehicle. The planet pinion sets are rotatably mounted on needle bearings supported on carrier pins 68 supported on the carrier 70. The inner diameter of the carrier arm is formed with a spline 72, which is brought into meshing engagement with a spline 74 formed on the outer surface of the selector hub 62.

When the high-low range selector within the passenger compartment is moved so that the shift fork 66, to which the range selector is attached, is in its forward position, hub 62 moves forward with the fork so that one portion of its inner spline surface 64 is brought into meshing engagement with the spline 60 formed on the transmission output shaft 44, and a second portion of spline 64 remains continuously engaged with the spline 76 formed on the outer suface of the rear driveshaft 18. In this position, the transmission is directly connected to the rear driveshaft 18 and the transfer case is set for operation in the high speed ratio range.

When the range selector moves shift fork 66 rearward, hub 62 moves with the fork to the position where clutch teeth 74 engage clutch teeth 72 formed on the carrier. In this position, shaft 44 drives sun gear 54 through spline 52 and carrier 70 revolves about the axis of shaft 44 because ring gear 58 provides a fixed surface upon which the planet pinion sets rotate. Carrier 70 transmits power in a low speed ratio range through the engaged clutch teeth 72, 74 and from the hub through the engaged splines 64, 76 to rear driveshaft 18. When the shift selector lever is in the neutral position, fork 66 is in the position shown in FIG. 2A and the rear driveshaft is driveably disconnected from the transmission output because neither spline 60 nor clutch 72 is driveably connected to hub 62.

Journalled on the output shaft is a drive sprocket 76 having teeth 78 in continuous engagement with an endless, flexible chain belt 80, which is engaged also by the teeth 82 of a driven sprocket 84 that is splined to shaft 86. Sprocket 76 has an outer spline surface 88 on which a lock-up hub 90 and clutch plate 92 are driveably connected and mounted for sliding movement toward the coil assembly of a magnetic clutch 94. Clutch hub 96 is splined at its inner diameter to drive shaft 18 and at its outer diameter 104 to a mating spline of the clutch coil housing 98, which provides a planar surface facing clutch plate 92.

Located within the clutch coil housing 98 is a coil of electrical wire 100 wound about the axis of the output shaft and nested within coil ring 102, which is joined mechanically to the transfer case 42. The spline 104 on the outer surface of the clutch hub 96 is aligned with the spline 88 formed on the driving sprocket 76. Therefore, as lock-up hub 90 is moved axially on spline 88, its spline can be moved into engagement with spline 104 of the clutch hub while remaining engaged with spline 88 of the drive sprocket 76. A retention ring 108 fixed to hub 90 is urged against collar 92 by a conical coiled spring 106. As the collar is moved rearward by fork 110, spring 106 is compressed, coil 100 is energized and the bevel faces 112, 114 on the adjacent ends of splines 91, 104, respectively, are brought into resilient contact. This is the engagement position. The force developed by the magnetic field induced by the coil acts to accelerate collar 92, which causes sprocket 76 to accelerate toward the speed of the shaft 18. When the speed of sprocket 76 approaches the speed of shaft 18, spring 106 forces hub 90 rearward when the teeth of spline 104 align with the spaces between the spline teeth on the inner surface of the hub. In this position, hub 90 driveably connects shaft 18 to sprocket 76. Forward movement of shift fork 110 has the effect of moving splines 91 and 104 out of contact or engagement because retention ring 108 causes collar 92 and hub 90 to move as a unit in that direction.

Shaft 86 is supported on the transfer case portions 40, 42 in ball bearings 116 and needle bearings 118. The angular disposed front output shaft 20 is connected by a Cardan joint 120 to the end of shaft 86.

Referring now to FIGS. 3 and 4, the automatic locking hubs 28 that lock the hub and wheel assembly to the front driving axleshaft 32, 34 are shown in the disengaged and engaged positions, respectively. When released, the associated front axleshaft is disengaged from the hub body assembly 122 and the hub and wheel assembly rotates freely on tapered roller bearings 126 supported on the spindle 124.

The automatic locking hub includes a hub body 122, an inner drive gear 128 splined to the axleshaft 32, and a bearing 130 for supporting body 122 in rotation on the axleshaft. On the outer surface of inner drive gear 128 there is a first spline 132 and a second spline 134 axially spaced from the first spline. A clutch ring 136 has spline teeth formed on its inner surface, which is moved axially into and out of engagement with the spline 134 of the inner driving gear, and has an outer spline surface that is continuously engaged with the spline 138 formed on the inner surface of the body. The recesses between spline teeth on the outer surface of the clutch ring accommodate three angularly spaced legs 140 of a clutch ring cage and permit these legs to extend axially from the inboard ring portion 142 of the clutch ring cage to the free ends of the legs at the outboard end of the cage. A cage spring 144 is compressed between ring portion 142 and clutch ring 136, the spring applying an outwardly directed force to the clutch ring tending to produce engagement of its internal spline with spline 134 of the inner drive gear. A clutch ring retainer cap 146 has an axial surface at its inboard face that contacts the adjacent face of the clutch ring under certain conditions and is retained in position at its outboard side by the outboard free end of the axially extending legs 140 of the cage. A main spring 148 is compressed between an inner surface of the hub body and an inclined surface at the free end of the cage leg.

A cam follower 150 is formed with an internal spline 152, which moves into and out of engagement with the splines 132 of the inner drive gear 128, and has three angularly spaced legs, which contact ramp surfaces on a fixed cam 154 and on a moving can 156. The outboard face of the cam follower abuts the inboard face of the clutch ring cage and the force of main spring 148 maintains these surfaces in contact throughout the operation of the locking hub. The force of the spring holds the inboard end of the legs of the cam follower in contact with the cam surfaces of cam 154, 156. The fixed cam 154 is keyed to the spindle 124 and has six legs angularly spaced about the axis of the hub, each leg being formed with a pair of oppositely inclined cam surfaces, which are engaged by the cam follower. Each leg of the fixed cam has a first inclined surface having one direction component parallel to the axis of the hub assembly and a second component directed tangentially. At the interior end of the first surface of the fixed cam is an intersecting second cam surface having axial and tangential direction components, its tangential component being larger than its axial component, equal to the tangential component of the first inclined surface, but of the opposite sense of direction.

The moving cam 156 is mounted on the outer cylindrical surface of spindle locknut 158, which is threaded on the spindle 124 so that the locknut and spindle rotate as a unit. A thrust bearing 160 and washer 162 are located between the flange of the locknut and the moving cam in order to facilitate relative rotation between them. Moving cam 156 is formed with three angularly spaced pockets, each pocket having an included angle about the hub axis of approximately 60 degrees into which are fitted friction shoes 164, which contact the outer cylindrical surface of the locknut and are biased against that surface by garter springs 166. Located between each pocket on the moving cam are three angularly spaced legs directed outboard from its inboard end, each leg being formed with first and second inclined cam surfaces, each having axial and tangential direction components. The direction components of the cam surfaces of each leg include axial components having the same magnitude and sense of direction and tangential components having the same magnitude but opposite sense of direction. Formed on each moving cam leg and located midway between the circumferential extremity of each leg at the intersection of the first and second cam surfaces of each leg is a boss that forms a stop surface and against which the cam follower makes contact as it rotates relative to the moving cam. After the cam follower contacts the boss of the moving cam, the cam follower and moving cam rotate as a unit provided the direction of rotation is such that the cam follower and boss maintain contact. However, when the directional sense of rotation changes, the cam follower disengages the boss and relative rotation between the moving cam and cam follower is possible.

When the front driveshaft 20 is driven by the chain belt 80 after the transfer case is disposed for four-wheel drive operation, the front axleshafts 32 are driven by the differential mechanism 36. In FIG. 3, spline 152 of the cam follower is located adjacent spline 132 of the inner drive gear and engagement of these splines occurs when the cam follower is moved outboard by the cam surfaces due to rotation of axleshaft 32. The axleshaft is driven by the front differential, the inner spline 170 of the clutch ring is disengaged from spline 134 of the inner drive gear, but it is located in position for engagement as the cam follower and clutch ring is moved outboard. As the front axleshafts being to rotate, the inner drive gear and the cam follower rotate with the axleshafts. The cam follower moves up the ramps of the fixed cam, and causes the cam follower and clutch ring cage 140 to move outboard, thereby compressing cage spring 144 and causing the outboard face of splines 170 to abut the inboard face of splines 134. The clutch ring will not engage the inner drive gear until the spline teeth become aligned, but after the splines are aligned, the cage spring produces the engagement shown in FIG. 4. When the clutch ring and inner drive gear splines are aligned, the clutch ring engages the inner drive gear, thereby producing a driveable connection between the axleshafts 32 and the hob body 122. The wheel assembly is mounted on a flange 172 and the front wheel 10 is driven from the axleshaft.

When the cam follower has moved to the outboard end of the fixed cam surface, further rotation causes the cam follower to move from the surface of the fixed cam onto the surface of the moving cam as shown in FIG. 4. In this position, the cam follower is held away from the surfaces of the fixed cam and full engagement of splines 170 and 134 is maintained.

Disengagement of the locking hub from the axleshaft occurs when the torque applied to the axleshaft is less than approximately 17 Nm, provided the transfer case is positioned for two-wheel drive operation and the vehicle is moved opposite the direction that produced engagement, When these conditions occur, the front axleshafts 32 are not driven from the engine, but the hub body 122 is rotated in the opposite direction from that which produced engagement by the wheel assembly as it rotates in contact with the ground. The clutch ring drives the inner drive gear and the cam follower moves inboard on the surfaces of the moving cam and fixed cam and is biased in that direction by the effect of the main spring 148. When the cam follower has moved inboard sufficiently far, the clutch ring splines 170 become disengaged from the splines 134 of the inner drive gear and the hub becomes disengaged from the axleshafts.

Figures 5A, 5B, 5C:
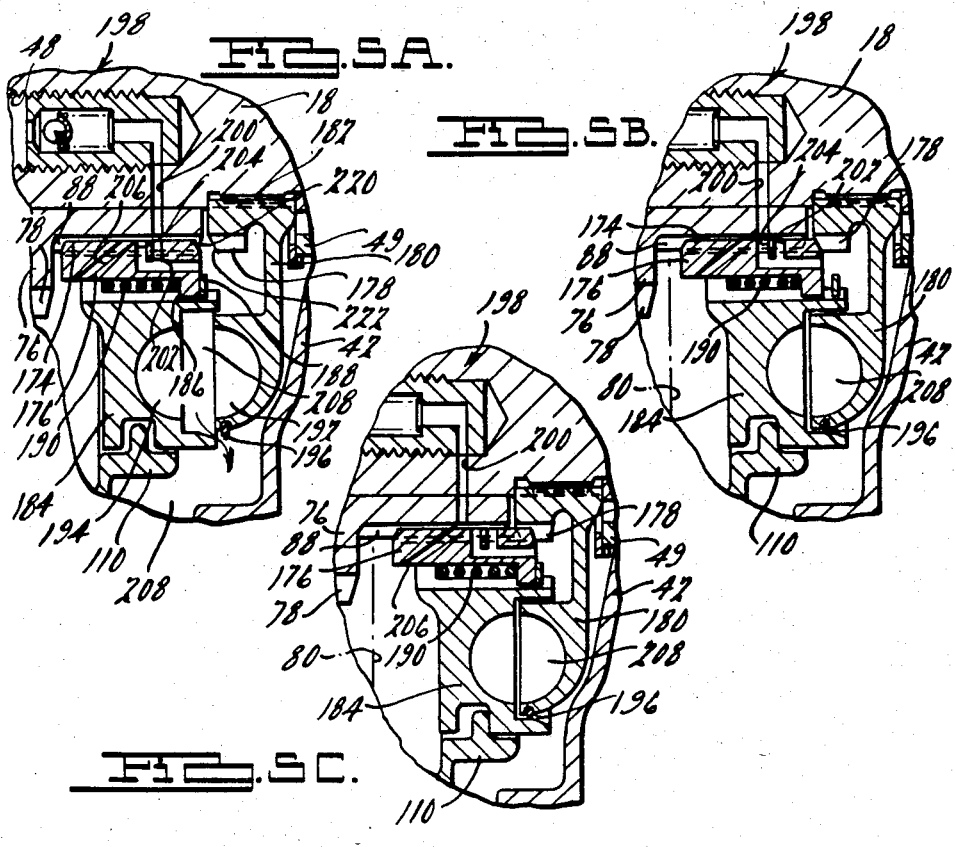
FIGS. 5A, 5B and 5C are partial cross sections taken at a plane that contains the axis of the rear driveshaft showing a hydraulic coupling whose turbine is carried by the collar of the lockup device.

A hydraulic system for accelerating the sprocket 76 so that the front driveshaft 20 can be driven from the chain belt 80 is shown in FIGS. 5A–5C. The spline teeth 88 formed on the outer surface of sprocket 76 are in continuous meshing engagement with the inner splines 174 of the hub 176, which is adapted to be moved axially rearward into engagement with the splines 178 of an impeller or driving member 180, driveably connected to the shaft 18 at a spline connection 182. A turbine 184 is driveably connected by a spline 186 to the hub, and a retaining ring 188 mounted on the turbine blocks a portion of the rearward movement of the hub relative to the turbine. Shift fork 110 engages the turbine in a recess and moves the turbine axially toward and away from the impeller as the 4WD-2WD shift selector is moved by the vehicle operator. Coil spring 190 biases the hub and turbine in opposite axial directions and tends to keep the hub in contact with the retention ring 188.

The impeller is fitted with multiple impeller blades 192 angularly spaced one from another in radial planes that extend outwardly from the axis of shaft 18. Similarly, the turbine carries multiple turbine blades 194 spaced angularly from one another and located in radial planes extending from the axis of the shaft 18. A seal 196 carried on the impeller is adapted to become compressed, as shown in FIGS. 5B and 5C, when the turbine is moved toward the impeller, thereby providing a hydraulic seal at the radially outer end of the toroidal chamber defined by the impeller and turbine in which the blades 192 and 194 are located.

The output port of pump 46 is hydraulically connected to the toroidal chamber through a bore 48 formed in shaft 18 and a check valve 198. A radial passage 200 is connected to one of several passages 202, 204, 206 that are brought into alignment with passage 200 as hub 176 is moved axially by the shift selector. Check valve 198 permits hydraulic fluid to flow from the pump outlet toward the hydraulic coupling formed by the impeller 180 and turbine 184 when they are moved to the position shown in FIGS. 5B and 5C, but prevents flow from the coupling toward the pump.

The pump 46 is a radial piston pump supplied with fluid from the sump 208 portion of the transfer case through an oil filter 210 and oil pickup tube 212 to the pump body 214, which is located between a front cover 216 and a rear cover 218. Diametrically opposed pistons are biased by springs within the body as they rotate and contact a surface that is located eccentric of the axis of output shaft 18. The eccentricity causes the pistons to work within the cylinder and to pump oil from the sump to the bore 48 of the output shaft.

In operation, when the 4WD-2WD shift selector is in the neutral position, the hydraulic device for accelerating sprocket 76 is in the disengagement position shown in FIG. 5A. Here the pump output flows through check valve 198, passages 200, 202 and through the hydraulic coupling defined by the impeller and turbine to the sump 209. Radial flow through the hydraulic coupling is permitted because seal 196 is out of contact with the adjacent surface on the turbine.

When four-wheel drive operation is selected, shift fork 110 moves to the engagement position shown in FIG. 5B moving the turbine rearward and causing seal 196 to become compressed on the inclined surface of the turbine casing, thereby sealing the outer periphery of the torus chamber 208. When the turbine moves rearward, the rear face 220 of spline 174 is moved into contact with the forward face 222 of spline 178. These splines will not engage when the speeds of the turbine and impeller are appreciably different, but they will rotate relative to one another with the surfaces 220, 222 in contact. This contact prevents further rearward motion of a turbine 184, but permits seal 196 to become compressed on the inclined surface of the turbine sealing the torus chamber. In the engagement position, spring 190 is compressed and applies a force that biases hub 176 rearward.

When chamber 208 is sealed, hydraulic fluid from the pump enters and fills the torus chamber through passages 200 and 204. The fluid in the cells between the blades 192 of impeller 180 is forced to rotate with the impeller and is, therefore, subjected to centrifugal force, which causes it to flow radially outward. Initially, turbine 184 is stationary and there is no centrifugal force on the fluid within it. The fluid in the impeller, under the influence of centrifugal force, enters the turbine near the outer circumference and forces fluid from the turbine into the impeller near the inner circumference. Thus, a circulation is set up, which continues as long as there is a difference between the speeds of the impeller and turbine. In normal operation, the turbine always turns at a lower speed than the impeller, and since both have substantially the same dimensions, the centrifugal force on the fluid in the impeller always is greater than that of the fluid in the turbine. It is this difference between the two centrifugal forces that causes the fluid to circulate in the torus. The fluid in the coupling has a dual motion; it travels with the impeller and turbine around the axis of the coupling, and it flows around the central core of the torus. Since the area of the flow path is constant around the torus, there is no change in velocity in the circumferential direction. On the other hand, the velocity of the whirling motion around the axis of the coupling increases as the liquid passes from the inlet to the outlet of the impeller, and decreases as it flows from the inlet to the outlet of the turbine. Since the velocity of the liquid increases in the impeller, its kinetic energy increases there, but this gain in kinetic energy can come only from the impeller. Therefore, the impeller encounters resistance as it increases the absolute velocity of fluid in the cells, and it takes power to keep the impeller running against this resistance. In the turbine, the fluid is slowed and presses forward against vanes 194. When the turbine is moving under this force, power is produced. In this way, the rotational speed of the turbine is increased toward the speed of output shaft 18 until a condition is reached that permits splines 174 and 178 to become engaged.

When the splines are engaged, the members of the device move to the engaged position shown in FIG. 5C. In this position, spring 190 expands somewhat and forces hub 176 into contact again with retaining ring 188. Hydraulic fluid is supplied through passage 200 and 206 to the sump and sprocket 76 is driven from the output shaft 18 through spline 182, engaged splines 174, 178, and engaged splines 174 and 88. In this way, power is transmitted to shaft 86 and sprocket 84 by the chain belt 80, and the front driveshaft 20 is driven causing the automatic hub locks to engage and the vehicle to be driven by the axleshafts of the forward and rear wheel sets.

When two-wheel drive operation is selected, shift fork 110 is moved forward to the disengagement position shown in FIG. 5A, thereby disengaging the impeller from the turbine, opening the torus chamber and driveably disconnecting the front driveshaft 20 from the output shaft 18.

Having described a preferred embodiment of my invention, what I claim and desire to secure by U.S. Letters Patent is:

1. A drive system for a vehicle having a first and a second set of wheels comprising:
   an engine;
   a transmission connected to the engine adapted to produce a range of drive ratios;
   a rotatably mounted driving member having a first clutch surface connected to the transmission output and continuously driveably connected to the first set of wheels;
   a rotatably mounted driven member having a second clutch surface;
   lockup means moveable to an engagement position where the driving member and driven member are driveably connectable and moveable to a disengagement position where said connection is released, said connection being made when the speeds of the driving member and driven member so permit, including a hub on which a third clutch surface is formed continuously engaged with either the first clutch surface or the second clutch surface and adapted to engage selectively either the second clutch surface or the first clutch surface with which the hub is not continuously engaged, a collar, stop means fixed to the collar for moving the collar and hub as a unit away from the engagement position and for permitting movement of the hub relative to the collar in the engagement position, and spring means for resiliently urging the hub toward the stop means and for resiliently urging the third clutch surface into engagement with either the second clutch surface or the first clutch surface with which the hub is not continuously engaged;
   actuating means for moving the lockup means collar to the engagement position and to the disengagement position;
   means for accelerating the driven member toward the speed of the driving member and within a range of speed that permits the lockup means to connect the driving member and the driven member;
   means for driveably connecting the driven member to the second set of wheels; and
   means for driveably disconnecting the driven member and the second set of wheels.

2. The system of claim 1 wherein the connecting means comprises:
   a first chain sprocket carried by the driven member;
   a second chain sprocket;
   an endless flexible chain belt driveably engaging the first and second chain sprockets for transmitting power therebetween;
   a first driveshaft driveably connected to the second chain sprocket;

an axle differential mechanism for transmitting power between the first driveshaft and first and second axleshafts of the second wheel set; and first and second hub lock means, one associated with each of the wheel hubs of the second wheel set, for driveably connecting the first and second axleshafts of the second wheel set to the associated wheel hubs provided the first and second axleshafts are driven from the driving member.

3. The system of claim 2 wherein the disconnecting means comprises means associated with the first and second hub lock means for driveably disconnecting the first and second axleshafts of the second wheel set from the associated wheel hubs provided the first and second axleshafts are not driven from the driving member.

4. The system of claim 2 wherein the hub lock means each comprise:

a hub on which a wheel of the second wheel set is mounted;

an inner drive gear coaxially mounted with and continuously driveably connected to an axleshaft of the second wheel set and having a first clutch surface;

a cam follower driveably connected to the inner drive gear;

a cam having a cam surface adapted to move the follower axially as the follower rotates with the axleshaft on the cam surface;

spring means biasing the follower into contact with the cam surface;

a clutch ring driveably connected to the hub and mounted for axial movement, having a clutch surface adapted to engage and disengage the clutch surface of the inner drive gear as the clutch ring moves axially; and means biasing the clutch ring into engagement with the inner drive gear.

5. The system of claim 4 wherein the spring means biases the clutch surface of the clutch ring out of engagement with the clutch surface of the inner drive gear as the cam follower moves away from the first clutch surface of the inner drive gear due to rotation of the hub and contact of the cam and cam follower.

6. The drive system of claim 1 wherein the driving member has a first stop surface facing the hub and the hub has a third stop surface facing the driving member, the first and third stop surfaces being biased by the spring means into contact to block movement of the hub toward the driving member, thereby preventing engagement of the first and third clutch surfaces when said clutch surfaces are nonaligned for engagement and to permit engagement of the first and third clutch surfaces when said clutch surfaces are aligned for engagement.

7. The drive system of claim 6 wherein the first surface is formed on the end of the first clutch surface tht faces the hub and the third surface is formed on the end of the third clutch surface that faces the driving member.

8. The drive system of claim 6 wherein the spring means resiliently urges the hub against the retention means, the actuating means moves the collar toward the driving member to the engagement position where the third surface is resiliently held against the first surface by the spring means until the first and third clutch surfaces engage.

9. The drive system of claim 1 wherein the driven member has a second surface facing the hub and the hub has a third surface facing the driving member, the second and third surfaces being biased by the spring means into contact to block movement of the hub toward the driven member, thereby preventing engagement of the second and third clutch surfaces when said clutch surfaces are nonaligned for engagement and to permit engagement of the second and third clutch surfaces when said clutch surfaces are aligned for engagement.

10. The drive system of claim 9 wherein the second surface is formed on the end of the second clutch surface that faces the hub and the third surface is formed on the end of the third clutch surface that faces the driven member.

* * * * *